H. C. LYONS.
DISPENSING MEANS FOR BEVERAGES CONTAINING CHOCOLATE, COCOA, ETC.
APPLICATION FILED DEC. 16, 1921.

1,428,043.

Patented Sept. 5, 1922.

Inventor:
Harry C. Lyons,
By his Attorney, Geo. W. Hiatt

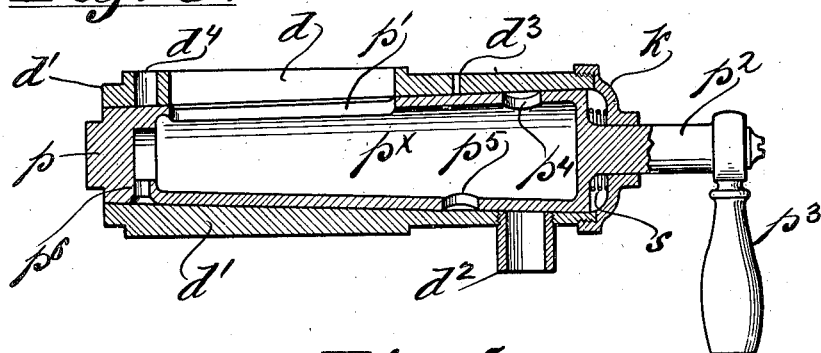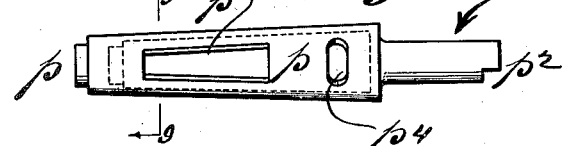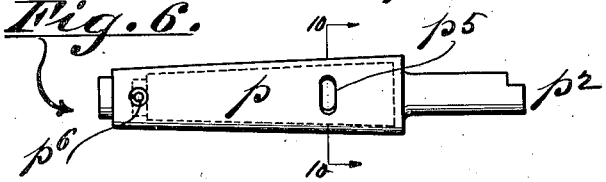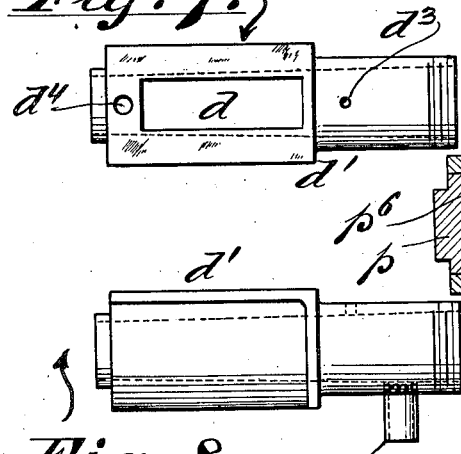

Patented Sept. 5, 1922.

1,428,043

UNITED STATES PATENT OFFICE.

HARRY C. LYONS, OF NEW YORK, N. Y.

DISPENSING MEANS FOR BEVERAGES CONTAINING CHOCOLATE, COCOA, ETC.

Application filed December 16, 1921. Serial No. 522,779.

*To all whom it may concern:*

Be it known that I, HARRY C. LYONS, a citizen of the United States, and a resident of the borough of Manhattan, city, county, and State of New York, have invented certain new and useful Improvements in Dispensing Means for Beverages Containing Chocolate, Cocoa, Etc., of which the following is a specification.

My improvements relates generally to the type of apparatus heretofore devised by myself for the dispensing of beverages containing extracts of cacao, such as chocolate, cocoa, etc., as set forth in Letters Patent No. 1,367,823, issued to me May 2, 1916, and also in my concurrent application Serial No. 512,719, filed November 4, 1921, in which milk, diluted or otherwise, is used as a vehicle to take up, flush out, and remove the heavier constituents of the beverage from the measuring chamber of a dispensing faucet.

As heretofore set forth, in the preparation of beverages containing chocolate, cocoa and the like, the extract of cacao is diluted more or less with hot milk and water, and is only partially dissolved thereby, the admixture being a solution in which the heavier constituents settle to the bottom thereof and constitute a sediment of viscid, semi-fluid character, while the upper part of the concoction is relatively thin and fluent. Hence, in dispensing beverages of this character, it was formally necessary to stir and agitate the admixture preparatory to pouring, or to prepare the same in small quantities for immediate use,—disadvantages which I obviate by my method of utilizing the flow of the more fluid constituents as a vehicle to flush out the heavier constituents of the admixture substantially as set forth in said Letters Patent No. 1,367,823.

The object of my present inventoin is to attain results analagous and equal to those heretofore attained by me by means of a floatable drain duct connected with the dispensing faucet, whereby the lighter fluid constituents of the beverage are drawn off from the upper part of a common reservoir in the lower part of which the heavier cacao syrup is contained, and more particularly as set forth in my aforesaid concurrent application Serial No. 512,719, in which the use of a dispensing faucet like unto that herein disclosed is also shown and described,—the distinctive feature in the present case being the dispensing with said floatable drain duct and substituting therefor a separate compartment in the urn for containing the diluted milk or other liquid vehicle fluent constituent of the beverage, said independent liquid vehicle compartment being connected with a discharge duct controlled by the faucet valve plug substantially in the same manner as is the discharge duct from the floatable drain duct as heretofore used, and particularly as set forth in said concurrent application.

In the accompanying drawings,

Fig. 3, is a central longitudinal sectional elevation, upon an enlarged scale, of my improved dispensing faucet, in closed position;

Fig. 4, is a like view of the faucet in position for discharge;

Fig. 5, is a view of the normally upper side of the valve plug;

Fig. 6, is a view of the normally under side of the valve plug;

Fig. 7, is a view of the upper side of the valve plug casing;

Fig. 8, is a side elevation thereof;

Fig. 9, is a transverse section taken upon plane of line 9—9, Fig. 5, but on a larger scale;

Fig. 10, is a transverse section taken upon plane of line 10—10, Fig. 6, but on a larger scale.

C, represents, generally, an urn or container of any desired or suitable construction and external configuration, designed for the reception and storage, temporarily, of the constituents of the cacao beverage to be dispensed through the faucet D. The urn C, is divided into two compartments $C'$, $C^2$, by a medial partition $c$, the compartment $C'$, being for the reception and storage of milk, diluted or otherwise, and the compartment $C^2$, for the reception and storage of the cacao solution. The rear portion of the floor $c^x$, of the reservoir is preferably convergently inclined toward said dispensing faucet D, as shown particularly in Fig. 1, of the drawings, for the purpose of concentrating the sedimentary constituents of the concoction in suitable juxtaposition to the outlet $c'$, which communicates with the inlet $d$, in the upper side of the casing $d'$, in which latter the valve plug $p$, is mounted, said casing being attached rigidly and permanently to the under side of the urn C, by any suitable means.

Figure 1:
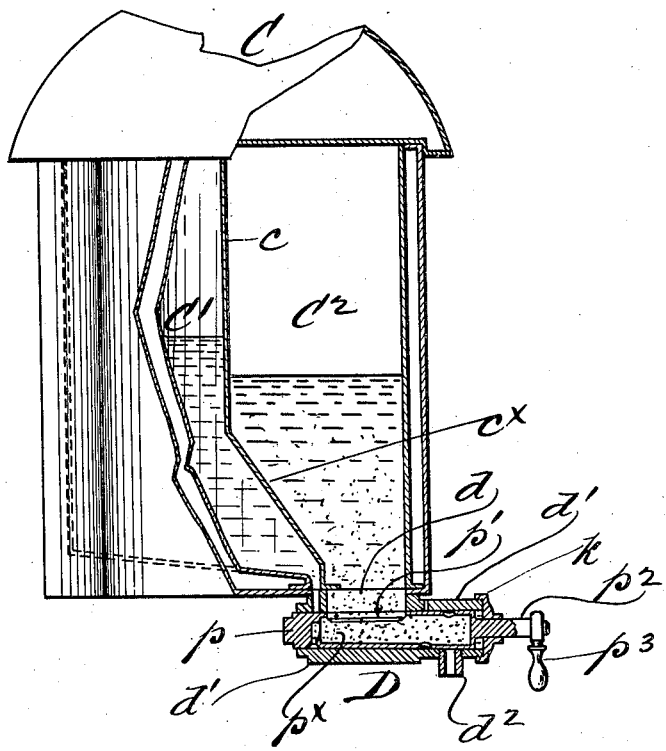
Fig. 1, is a partial central vertical sectional elevation of a dispensing urn for cacao beverages, embodying the essential features of my invention.
Figure 2:
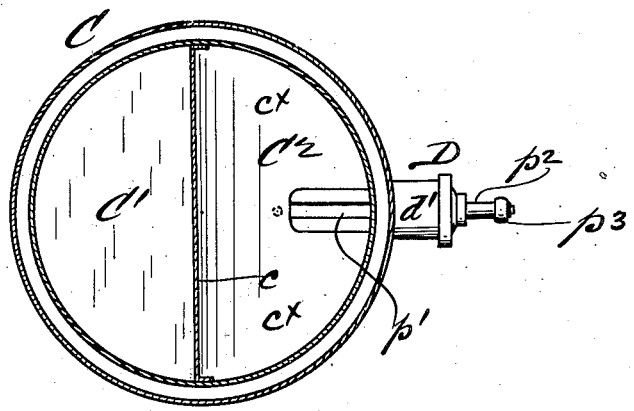
Fig. 2, is a horizontal section thereof, taken upon plane of line 2—2, Fig. 1.

The valve plug $p$, is slightly conical, tapering rearward, and is held to its concavo-conoidal seat in the casing $d'$, by a spring $s$, interposed between its forward extremity and a cap $k$, screwing onto the outer end of the valve casing $d'$, as shown more particularly in Figs. 1, 3 and 4. Near its forward extremity said casing $d'$, is formed with the discharge spout $d^2$.

The valve plug $p$, is formed with an elongated inlet port $p'$, on its normally upper side, which, when the valve is closed to the discharge spout $d^2$, coincides with the inlet $d$, in the casing $d'$, as shown in Figs. 1 and 4, thereby admitting the semi-fluid sedimentary deposit in the lower part of the reservoir $C^2$, to the measuring chamber $p^x$, in said valve plug $p$, as indicated more particularly in Fig. 1. The valve plug $p$, is of course provided with the usual stem $p^2$, and handle $p^3$, to facilitate manipulation, a half turn of said plug in either direction sufficing to open or close the faucet, as the case may be.

On the same side of the valve plug $p$, as the inlet port $p'$, is the discharge port $p^4$, which, when the plug is reversed or turned into position for discharge, coincides with the spout $d^2$, of the casing $d'$, as shown in Fig. 4. When the valve plug $p$, is in this position its vent port $p^5$, coincides with the vent hole $d^3$, in the upper side of the casing $d'$, so as to facilitate the discharge of the contents of the measuring chamber $p^x$. Likewise, when the valve plug is thus reversed from normal position, its rear inlet port $p^6$, coincides with the fluid vehicle inlet port $d^4$, in the casing $d'$, as also shown in said Fig. 4, said inlet port $p^6$, being on the side of the valve plug opposite to that on which the inlet port $p'$, and discharge port $p^4$, are situated.

The vehicle inlet port $d^4$, communicates directly with the fluid vehicle compartment $C'$, when the valve plug $p$, is turned into discharge position as shown in Fig. 4, thereby admitting the fluid vehicle into the measuring chamber $p^x$, of the valve plug $p$, and insuring the flushing of the latter and the discharge of all of the syrup or heavier constitutents of the beverage.

An important practical advantage attained by this specific construction and arrangement of parts is that the fluid vehicle may be drawn off entirely from the compartment $C'$, when the valve plug $p$, is in this position of discharge, and the said compartment $C'$, washed out and scalded preparatory to the introduction of a fresh supply of milk fluid,—thus facilitating the removal of stale or sour milk and the substitution of fresh milk as required, without disturbing the heavier constituents of the beverages in the cacao compartment $C^2$.

I have herein shown my two container compartments $C'$ $C^2$, as incorporated in a single casing or urn structure C, although it is obvious that said compartments $C'$, $C^2$, may be separate, and independent of each other, except as connected by my duplex-functioning dispensing faucet D, so that I do not limit myself in this respect, the essential feature being the utilization of said dispensing faucet D, substantially as herein described,—i. e., for direct communication with both the fluid vehicle compartment $C'$, and the cacao solution compartment $C^2$, for the purpose set forth.

What I claim as my invention and desire to secure by Letters Patent is,

1. In liquid dispensing apparatus of the character designated, the combination of a container formed with two compartments, one for the fluid vehicle constituents of the beverage and one for the cacao constituent of the beverage, and a dispensing faucet connected with said container and formed with a rotatable valve plug having a measuring chamber with a discharge port and also with an inlet on one and the same side, the latter communicatable with the discharge port of the cacao compartment, and on the other side with an inlet port communicatable with the discharge port of the fluid vehicle constituent compartment, for the purpose described.

2. In liquid dispensing apparatus of the character designated, the combination of two container compartments, one for the fluid vehicle constituents of the beverage and one for the cacao constituent of the beverage, and a dispensing faucet connected with said container and formed with a rotatable valve plug having a measuring chamber with a discharge port and also with an inlet on one and the same side, the latter communicatable with the discharge port of the cacao compartment, and on the other side with an inlet port communicatable with the discharge port of the fluid vehicle constituent compartment, for the purpose described.

HARRY C. LYONS.

Witnesses:
 DOROTHY M. CARMICHAEL,
 GEO. WM. MIATT.